Dec. 11, 1951     J. R. GARRETT     2,578,132
FEED CONTROL ATTACHMENT FOR TORCHES
Filed Aug. 19, 1948     2 SHEETS—SHEET 1
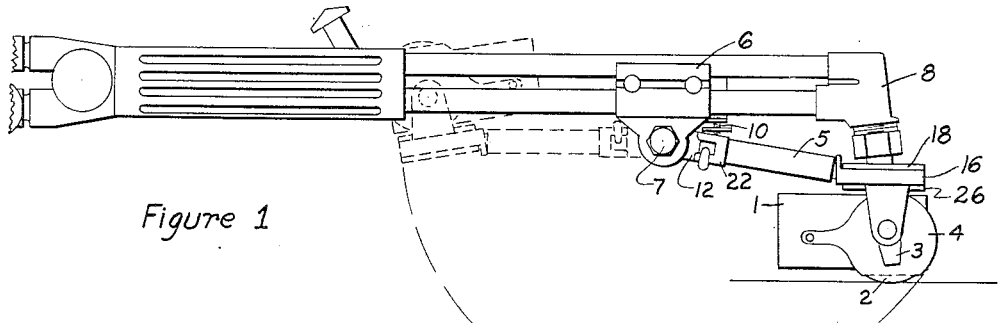
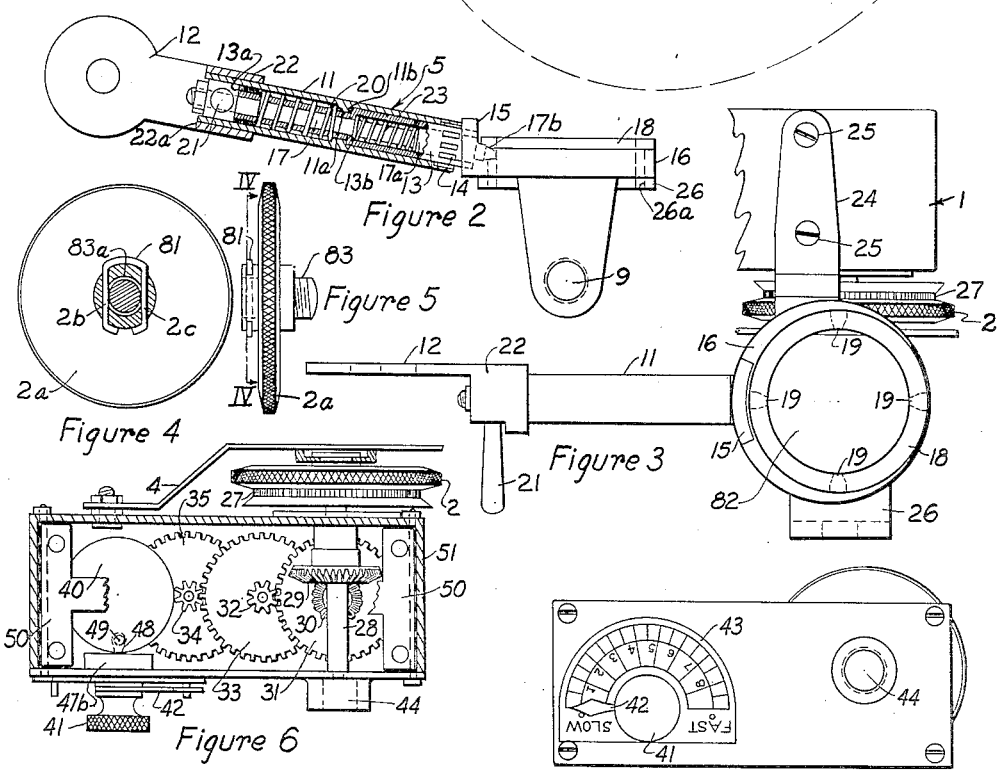
Inventor
John Roy Garrett Dec. 11, 1951          J. R. GARRETT          2,578,132
FEED CONTROL ATTACHMENT FOR TORCHES
Filed Aug. 19, 1948                              2 SHEETS—SHEET 2
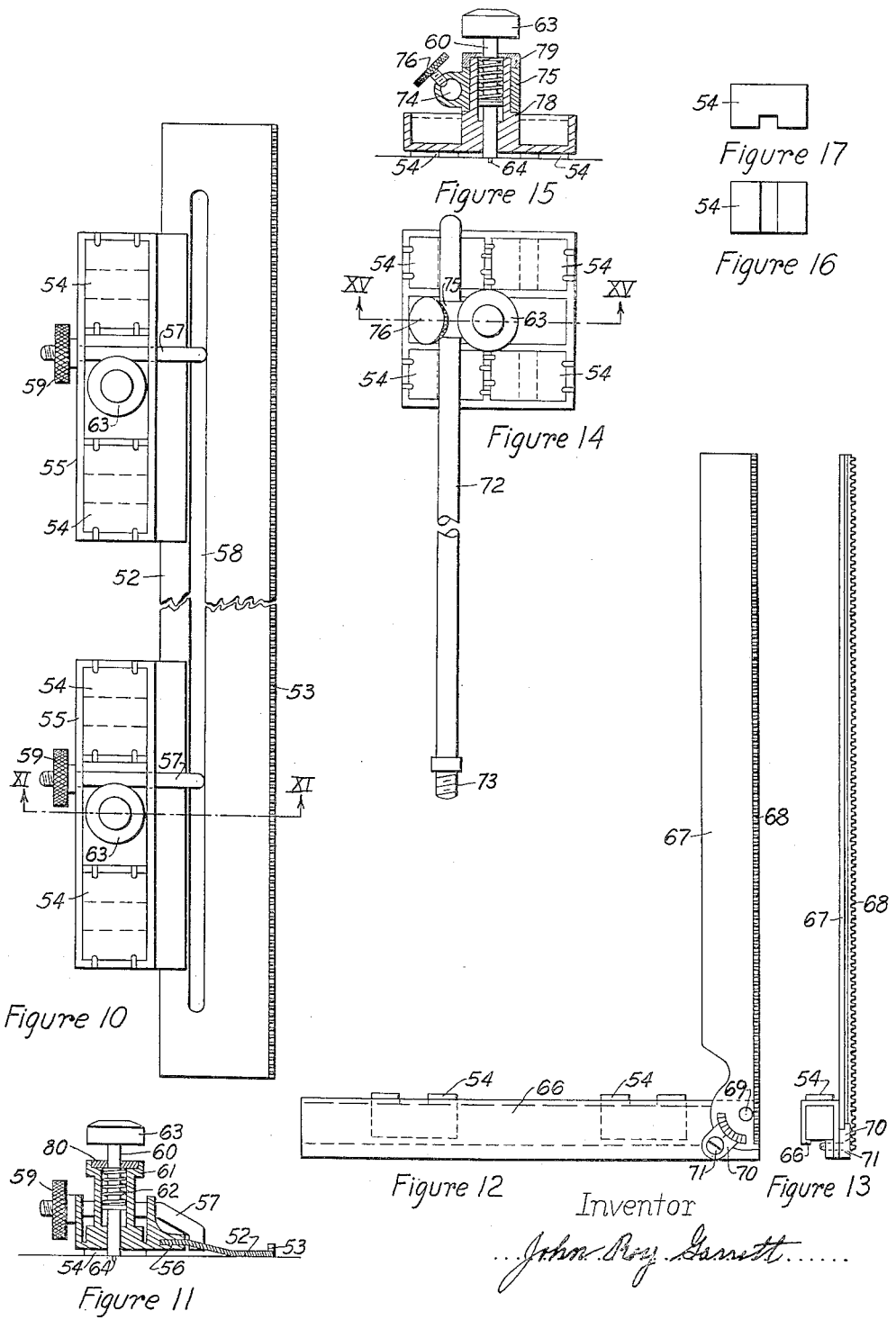
Inventor
John Roy Garrett Patented Dec. 11, 1951

2,578,132

UNITED STATES PATENT OFFICE 2,578,132

FEED CONTROL ATTACHMENT FOR TORCHES

John Roy Garrett, Aurora, Ill.

Application August 19, 1948, Serial No. 45,087

3 Claims. (Cl. 33—32)

This invention relates to attachments for torches and more particularly to attachments for a cutting torch by which to control and regulate the speed and the direction of movement of the torch flame during operation.

Blow-pipes, commonly referred to as torches, are usually operated by hand, that is, the movements are made and controlled by hand. As a result, edges of metal that are cut by the flame are irregular and jagged. Such edges are dangerous and require much additional labor by grinding or other finishing operations to effect smooth surfaces. The attachment of this invention seeks to eliminate the above objectionable features by providing a regulated speed control for the movement of the torch and also a guide for directing movement of the torch in a predetermined direction or pattern.

It is, therefore, an important object of this invention to provide an attachment for a torch by which to adjustably control the rate of movement of the flame during the operation thereof.

Another object of this invention is to provide an attachment for a torch whereby to guide it in a predetermined direction or pattern.

A still further object of the invention is to provide an attachment for a torch which mechanically controls the rate of movement and guides the torch in a predetermined path.

Still another object of the invention is the provision of a control attachment for a torch for use in cutting, welding or heating, which attachment is simple in construction, economical to manufacture, convenient in use, and highly efficient in operation.

Another and still further object of the invention is the provision of a feed control attachment for a torch which may be swung to an out-of-the-way, inoperative and balanced position on the torch whereby to permit free-hand operation of the torch.

Still another object of the invention is to provide a control attachment for a torch which attachment may be swung to operative and inoperative positions and quickly locked in place without the addition or removal of such attaching means as bolts or its like.

Other and further objects of the invention will become apparent to those skilled in the art from the following detailed description of the preferred embodiments of the invention as disclosed in the annexed sheets of drawings.

On the drawings:

Figure 1 is a fragmentary view in side elevation of a cutting torch and control attachment of this invention showing the latter, in full lines, in an operative position, and, in dotted lines, in a folded out-of-the-way or inoperative position;

Figure 2 is an enlarged side view in elevation, with parts in vertical cross-section, of the bracket arm by which the control attachment is connected to a cutting torch;

Figure 3 is a fragmentary top elevational view of the bracket arm shown in Figure 2;

Figure 4 is a vertical cross-sectional view taken along the line IV—IV of Figure 5;

Figure 5 is a side view in elevation of an auxiliary steady or traction wheel;

Figure 6 is a bottom view in elevation, with a sidewall broken away, showing an exposed gear train and governor of the feed control mechanism;

Figure 7 is a view of the exposed mechanism shown in Figure 6 when seen from the side;

Figure 8 is the same view as Figure 7 showing the housing in place covering the gear and governor mechanism, and the location of the feed control indicator;

Figure 9 is a fragmentary perspective view of the indicator control mechanism;

Figure 10 is a broken plan view illustrating a magnetically attached straight edge having a gear track guide;

Figure 11 is a vertical cross-sectional view, with parts in elevation, taken along the line XI—XI of Figure 10;

Figure 12 is a view of a magnetically attached combination try-square and protractor with a gear track guide;

Figure 13 is a side view in elevation of the device shown in Figure 12;

Figure 14 is a broken plan view of a circular feed control mechanism;

Figure 15 is a vertical cross-sectional view, with parts in elevation, taken along the line XV—XV of Figure 14;

Figure 16 is a bottom view of a permanent magnet illustrated in the devices of Figures 10, 12 and 14; and, Figure 17 is a plan view of the magnet shown in Figure 16.

As shown on the drawings:

The feed control attachment 1 is shown in Figure 1 as being attached to any standard cutting torch 8 in a position ready for operation. The attachment provides a knurled steady or traction wheel 2 by which to support the torch as it moves over the surface of the material being worked on. A baffle plate 4 serves to protect the wheel from heat emitting from a burner tip 3 and from slag built up during cutting or welding operations.

Attachment of the feed control mechanism to the torch is by means of a bracket arm 5 pivoted to a bracket clamp 6 by a bolt or other securing means 7. A vertical adjustment of the control attachment relative to the burner tip is effected through a thumb screw 10 which is threaded into the bracket clamp 6 and, when turned, swings the bracket arm 5 around its pivot 7.

Bolt 7, besides serving as a pivot for arm 5, is a clamping member whereby the attachment may be locked in a desired position on the pivotable orbit. When it is desired to use the torch for free-hand cutting, the attachment is swung on its pivot to an out-of-the-way position, shown in dotted lines, and locked by the bolt 7. When folded, the attachment is so positioned as to be in balance with the torch relative to the operator's grip.

Figures 2, 3, 4 and 5 show the construction in greater detail of the guide or supporting wheel and the pivoted carrier bracket arm. The bracket arm 5 includes an outside sleeve 11 which has one end connected to and within a hollow end 22 on a pivot collar 12 and its other end secured by interengaging splines to an inside sleeve 13. The inside sleeve 13 serves as a bearing for an index pin 17 and is so shaped otherwise that adjacent one end an abutment sleeve 13a embraces it, and its other end threads into or is otherwise secured to a lug 15 extending from a ring-like index collar 16. A coiled spring 20 abuts against the sleeve 13a. The spring is positioned between the inside and outside sleeves and extends with one end against the sleeve 13a and its other end seated against an internal shoulder 11a on the outside sleeve. Another spring 23 embraces the pin 17 within the inside sleeve 13 and one end abuts against the internal shoulder 13b on the inside sleeve and the other end against an enlarged end 17a of the pin 17. An internal shoulder abutment 11b on the sleeves limits their relative movement in one direction. The spring 23 exerts thrust to the index pin whereby to maintain the tapered end 17b in one of the index openings 19, 19 provided in the ring 18 of the indexing ring construction. This permits horizontal indexing of the attachment relative to and around the burner tip which extends through the collar 16. The indexing ring construction includes the outer collar 16 which is rotatably supported between a shoulder plate 26 and the ring 18 which threads into the plate 26 at 26a. Release of the index pin from the ring is accomplished by a bolt-action. This is effected by pulling a bolt 21, attached to the index pin, towards the pivot 7 and rotating and locking it in a downward position on a shoulder 22a of the end 22. The release of the index pin frees the ring 18 and the connected shoulder plate 26 with the attached steady wheel 2 for swiveling or rotation around the collar 16 and also around the burner tip thereby enabling an operator of the torch to maintain a fixed body position when engaged in cutting operations in an irregular or circular path.

Interengaging splines, shown at 14, on the inside and outside sleeves permit vertical indexing of the attachment by changing its angular relation to the burner tip. The parts are so constructed as to permit adjustments of the burner tip up to 45° from either side of vertical. By so doing, it is possible to obtain beveled-edge cutting. This is effected by grasping the index collar 16 and pulling it in a direction away from the pivot 7 thereby collapsing the spring 20 and disengaging the splines. The index collar is then rotated to the desired setting and released whereupon the spring urges the splines into re-engagement.

An auxiliary steady or traction wheel 2a may be used if desired. When used, it increases the steadiness of the cutting operation. As shown, and like the wheel 2, the periphery of wheel 2a is knurled to prevent skidding on the surface of the work. It is attached to the control mechanism by means of a threaded spindle 83 which threads into the opening 9 in the arm extending downwardly from the shoulder plate 26. Figure 4 shows how the wheel is secured to the spindle. A U-shaped wire 81 is threaded into spaced openings 2b and 2c provided in the wheel hub and through a groove 83a in the periphery of the spindle. The ends are crimped to lock the wire in place.

In Figure 3 is shown details of the attachment of the feed control device 1. A bridge bar 24 extends from the shoulder plate 26. The feed control device is attached to the bridge bar by means of securing members 25, 25 such for example as bolts, screws, rivets, or the like.

The internal mechanism of the feed control is best seen in Figures 6 and 7. This mechanism is mounted on a frame 50 inside a housing 51. The knurled guide or steady wheel 2 is co-mounted on a spindle 28 with a beveled gear 29. A beveled pinion gear 30 is driven by the gear 29 and in turn drives the following speed-changing gears in sequence: a spur gear 31, pinion 32, gear 33, pinion 34, gear 35, and a gear 36 which is connected to a governor construction. While a specific type of governor construction is shown, it will be apparent that practically any of the rotating speed control devices will operate satisfactorily.

The size of the gears and pinions between the steady wheel and the governor may be varied to obtain the overall ratio desired. As the steady wheel is moved over the work its rotation is transmitted to the governor through the shaft 36a. The governor includes counterweights 39, 39 secured to hinged link assemblies 38, 38 which connect a cross-beam 38b, secured to the shaft 36a for rotation therewith, and a brake wheel 40, which is mounted on the shaft for both rotation and axial movement. It will be seen in Figure 7 that the brake wheel 40 has a long hub 40a which is slotted at 40b and receives therein a pin 40c carried by and projecting laterally from the shaft. A spring 37 normally maintains the cross-beam 38b and brake wheel 40 in spaced apart relation.

As the governor rotates the counterweights move outwardly away from each other thereby drawing the brake wheel 40 towards the cross-beam 38b as the spring 37 collapses. When the thrust exerted by the spring is greater than the centrifugal force exerted by the counterweights 39, 39, the brake wheel assumes its outermost position shown in Figure 7.

The movement of the brake wheel 40 along the shaft brings it into and out of engagement with a brake 48. Adjustment of the brake, to regulate the speed at which the attachment may be moved over a work surface, is shown in Figures 8 and 9. The knob 41 is turned to set a needle 42 at the desired speed graduation on the indicator 43. To the knob 41 is connected a cam wheel 45 and a cam pin 46 which, when the knob is turned, effects reciprocal movement to the bearing bar 47, the link 47a carried thereby, and the attached brake arm 48. A friction pad 49 is mounted on the brake arm to contact the brake wheel 40 and provide braking action. The link 47a extends into a guide 47b secured to the inside of the housing 51 and having a slot 47c by which to guide the movement of the brake arm. The closer the friction pad is moved to the brake wheel the quicker braking action results which causes the attachment to be moved at a slower speed. By regulating the speed at a desired constant rate at which the attachment can be moved over a work surface, the torch flame is moved more evenly and smoothly. This is not possible when the torch is controlled entirely by hand.

Additional devices, as shown in Figures 10 to 17 inclusive, are provided when it is desired to further control the operation of a cutting torch by defining a definite and pre-determined cutting path.

In Figure 10 there is illustrated a straight edge 52. A rack gear 53 cooperates with the flanged guide wheel gear 27 (see Figures 3 and 6) to insure accurate, straight line cutting by the torch. In so doing the knurled periphery of the guide wheel 2 clears the surface and no longer gives traction. The straight edge is held in a desired position on the metal surface upon which work is to be performed by the permanent magnets 54, 54. These magnets are generally U-shaped (Figures 16 and 17). In the straight edge 52, the magnets are enclosed in frames 55, 55. Each of the frames has a groove 56 (Figure 11) to receive a marginal edge of the straight edge. Clamp bolts 57, one for and extending through each frame and into a slot 58, secure the straight edge to the slotted frames by means of clamp nuts 59. When the nuts are loosened, the straight edge can be slid to any desired location relative to the frames.

On each frame is provided a plunger-punch mechanism 60 in housing 61. When the head 63 is struck with a hammer, a straight-sided punch pin 64 is driven into the metal work surface. Spring 62 seats against a stationary backing plate 80 to exert pressure on the punch pin to keep it embedded in the metal to eliminate sliding of the magnets along the surface.

In Figure 12 is illustrated a try-square and protractor combination by which straight-line cutting at any desired angle relative to the stationary base may be obtained. The frame or base 66 is located in a desired position on an edge of the metal to be worked and retained in that position by the magnets 54, 54. The blade 67, having a rack gear track 68 upon which the control attachment operates, is pivoted at 69 to the base. A graduated protractor 70 indicates the angular position to which the blade may be moved relative to the base 66. The pivoted parts of the try-square are locked together by a clamp screw or bolt 71. It will be noted that the magnets 54, 54 are secured to the frame 66 along the inside edge thereof while the rack 68 is positioned along the outside edge of blade 67.

In Figures 14 and 15 are shown a compass device by which a torch burner tip may be moved in a circular or radial path. A beam 72 has a threaded end 73 which screws into the opening 9 in the shoulder plate 26 of the control attachment, see Figure 2, or into the hole 44 in the side of the speed control mechanism housing, see Figures 6 and 8.

The opposite end of the beam fits into an opening 74 in a collar 75 and is clamped in place by a set screw 76. Lengthwise adjustment of the beam in the clamp determines the radius of the circular cutting path. The base or support for the beam is anchored in place by the magnets 54, 54 and a plunger-punch construction similar to that previously described. In the plunger-punch illustrated in Figure 15 the collar 75 is rotatably mounted on the housing 78 in order that the beam may swing in an arc. The collar is retained in place by a cap 79 which threads on the end of the housing and provides a shoulder against which the collar rotates.

The invention has been described herein more or less precisely as to details, yet it is to be understood that the invention is not limited thereby, as changes may be made in the arrangement and proportion of parts, and equivalents may be substituted, without departing from the spirit and scope of the invention.

I claim as my invention:

1. In a cutting torch guide device, said device comprising a flat elongated guide member, the outer side of said guide member being upwardly off-set in relation to the other side of the guide member, spaced frames to the outside of the upwardly off-set portion of the guide member, downwardly extending magnets carried by said spaced frames and adapted to engage an attracting surface, the upwardly off-set side of the guide member being disposed in longitudinal channels in the inner sides of the frames, means for detachably holding said upwardly off-set portions of the guide member in the channels of the frames, surface piercing members carried by the frames, said frames being longitudinally adjustable on the guide member.

2. A device as set forth in claim 1 wherein the means for holding the frames and guide member together comprises bolts extending transversely through the frames, the inner ends of said bolts inclining downwardly and inwardly and terminating in lugs longitudinally adjustable in a longitudinal slot in the guide member.

3. A device as set forth in claim 1 wherein the surface piercing members comprise vertically slidable shafts, said shafts extending downwardly through guides carried by the frames, the lower end of said shafts having indenting points below the frames, spring means for normally urging said shafts downwardly and heads carried by said shafts and forming means whereby blows will cause the piercing members to indent a surface below the frames.

JOHN ROY GARRETT.

REFERENCES CITED

The following references are of record in the file of this patent:

UNITED STATES PATENTS

| Number | Name | Date |
| --- | --- | --- |
| 932,740 | Wiss | Aug. 31, 1909 |
| 943,886 | Nunamaker | Dec. 21, 1909 |
| 1,162,587 | Eimann | Nov. 30, 1915 |
| 1,358,637 | Herron | Nov. 9, 1920 |
| 1,804,271 | Palmer | May 5, 1931 |
| 1,932,641 | Scheidhauer | Oct. 31, 1933 |
| 2,085,112 | McKierman | June 29, 1937 |
| 2,170,305 | Ingwersen | Aug. 22, 1939 |
| 2,281,814 | Willoughby | May 5, 1942 |
| 2,424,286 | Robbins | July 22, 1947 |
| 2,432,703 | Walden | Dec. 16, 1947 |
| 2,442,505 | Millett | June 1, 1948 |

FOREIGN PATENTS

| Number | Country | Date |
| --- | --- | --- |
| 803,794 | France | July 20, 1936 |